United States Patent
Shioda et al.

(10) Patent No.: US 7,324,723 B2
(45) Date of Patent: Jan. 29, 2008

(54) OPTICAL WAVEGUIDE HAVING SPECULAR SURFACE FORMED BY LASER BEAM MACHINING

(75) Inventors: Tsuyoshi Shioda, Sodegaura (JP); Kenji Suzuki, Sodegaura (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 10/942,843

(22) Filed: Sep. 17, 2004

(65) Prior Publication Data

US 2005/0074207 A1 Apr. 7, 2005

(30) Foreign Application Priority Data

| Oct. 6, 2003 | (JP) | ............................. 2003-347357 |
| Dec. 26, 2003 | (JP) | ............................. 2003-432799 |
| Mar. 3, 2004 | (JP) | ............................. 2004-059114 |

(51) Int. Cl.
  *G02B 6/26* (2006.01)
(52) U.S. Cl. ........................... 385/31; 385/14; 385/129
(58) Field of Classification Search ..................... None
  See application file for complete search history.

(56) References Cited

U.S. PATENT DOCUMENTS

| 5,062,680 A | | 11/1991 | Imamura et al. |
| 5,108,201 A | | 4/1992 | Matsuura et al. |
| 5,195,150 A | * | 3/1993 | Stegmueller et al. ......... 385/33 |
| 5,263,111 A | * | 11/1993 | Nurse et al. ................ 385/130 |
| 5,499,309 A | * | 3/1996 | Kozuka et al. ............... 385/38 |
| 5,737,458 A | | 4/1998 | Wojnarowski et al. |
| 5,745,619 A | * | 4/1998 | Li et al. ...................... 385/48 |
| 5,999,670 A | | 12/1999 | Yoshimura et al. |
| 6,325,553 B1 | * | 12/2001 | Deacon et al. ................ 385/89 |
| 6,331,382 B1 | | 12/2001 | Robertsson |
| 6,529,661 B2 | * | 3/2003 | Kropp .......................... 385/38 |
| 6,975,792 B1 | * | 12/2005 | Goldberg et al. ............. 385/31 |

(Continued)

FOREIGN PATENT DOCUMENTS

EP   0 519 475 A1   12/1992

(Continued)

OTHER PUBLICATIONS

Mikami et al., "Development of Optical Surface Mounting Technology," *The IEICE Transactions (Japanese Edition)*, 2001, pp. 715-726, vol. J84-C, No. 9 (partial translation).

(Continued)

*Primary Examiner*—Sung Pak
(74) *Attorney, Agent, or Firm*—Buchanan Ingersoll & Rooney PC

(57) ABSTRACT

An optical waveguide having means for performing optical coupling with high efficiency at a predetermined position in an optical circuit substrate and which optionally includes an optical-electrical circuit board. Also provided are an optical waveguide, an optical path thereof being changed in an optical circuit at a steep angle and the optical waveguide for performing coupling and splitting of light being decreased in size in the optical circuit. The optical waveguide has a core and a cladding layer, and a wall surface, which is formed by cutting out at least a part of the core in a thickness direction of the core through irradiation of a laser beam and crosses at least a part of the core, which is a specular surface.

9 Claims, 8 Drawing Sheets

U.S. PATENT DOCUMENTS

| | | | |
|---|---|---|---|
| 7,006,736 B2 * | 2/2006 | Lee et al. | 385/47 |
| 2002/0039464 A1 | 4/2002 | Yoshimura et al. | |
| 2002/0097962 A1 | 7/2002 | Yoshimura et al. | |

FOREIGN PATENT DOCUMENTS

| | | |
|---|---|---|
| EP | 0 903 596 A2 | 3/1999 |
| EP | 1 014 121 A2 | 6/2000 |
| EP | 1 237 019 A2 | 9/2002 |
| EP | 1 347 317 A1 | 9/2003 |
| GB | 2 373 343 A | 9/2002 |
| JP | 3-188402 A | 8/1991 |
| JP | 4-009807 A | 1/1992 |
| JP | 04264409 A * | 9/1992 |
| JP | 10-300961 A | 11/1998 |
| WO | 99 45421 A2 | 9/1999 |

OTHER PUBLICATIONS

Partial European Search Report, dated Sep. 20, 2007, issued in connection with European Patent Application No. 07015498.

* cited by examiner

OPTICAL WAVEGUIDE HAVING SPECULAR SURFACE FORMED BY LASER BEAM MACHINING

BACKGROUND OF THE INVENTION

1. Field of the Invention

The present invention relates to a polymer optical waveguide in which an optical path of a light beam can be changed, and more particularly, to a method of manufacturing an optical integrated circuit, an optical-interconnection optical component, an optical-electrical circuit board, etc.

2. Description of the Related Art

As base members of optical components or optical fibers, inorganic materials such as quartz glass or multi-element glass characterized by a low transmission loss and a wide transmission band are widely used. However, since recently developed polymer materials have excellent machining properties and low cost in comparison with these inorganic materials, the polymer materials have received a lot of attention as materials for optical waveguides. For example, there has been provided a flat optical waveguide having a core-clad structure in which a core is formed out of a polymer having excellent transparency such as polymethylmethacrylate (PMMA) or polystyrene and a cladding is formed out of a polymer having a lower refractive index than that of the core material (Japanese Unexamined Patent Application Publication No. 3-188402). Alternatively, there has also been realized a low loss flat optical waveguide using polyimide which is a transparent polymer having a high thermal resistance (Japanese Unexamined Patent Application Publication No. 4-9807).

In view of the requirement for low cost, vertical cavity surface emitting lasers (VCSEL) are expected to be used in the field of optical interconnection, but when a laser beam to be emitted vertically to a substrate is incident on the optical waveguide parallel to the substrate, about a 90° change in the direction of the optical path is required. The polymer optical waveguide is cut at about 45° by a dicing saw, thereby enabling the 90° change of the optical path (see Patent Document 1: Japanese Unexamined Patent Application Publication No. 10-300961). However, when using the dicing saw, even unnecessary portions are cut out at 45°. For this reason, when using the dicing saw, it is impossible to form the optical coupling for the change of an optical path at any place in a substrate.

On the other hand, there was reported a method of forming a circular hole in an optically printed substrate using an excimer laser (Non-patent Document 1). The circular hole is equivalent to a micro lens, and the light usually diverges, so that the coupling efficiency is largely reduced. In order to enhance the coupling efficiency, complex asymmetric coupling optical systems are required, and it is necessary to arrange them in the order below micro meters. This is insubstantial in an optical-electrical circuit board.

Recently, decrease in size of optical components using the optical waveguide is required more and more. For this reason, it is necessary to bend, split, or couple the light over a short distance. Further, in the optical-electrical circuit board, it is necessary to arrange optical paths with the shortest distance at various positions. However, in the conventional curved optical waveguide or light coupling and splitting optical waveguide, it is impossible to form the optical waveguide to be smaller than a predetermined size or length due to restriction of a specific refractive-index difference. Therefore, there has been required an optical waveguide capable of decreasing the size of circuits.

[Patent Document 1] Japanese Unexamined Patent Application Publication No. 3-188402

[Patent Document 2] Japanese Unexamined Patent Application Publication No. 4-9807

[Patent Document 3] Japanese Unexamined Patent Application Publication No. 10-300961

[Non-patent Document 1] Paper of Japanese Institute of Electronic Information and Communications, 2001/September, Vol.J84-C No.9, pp. 724 to 725.

SUMMARY OF THE INVENTION

The present invention is designed to solve the aforementioned problems, and it is an object of the present invention to provide an optical waveguide having means for performing optical coupling with high efficiency at a predetermined position in an optical circuit substrate including an optical-electrical circuit board. In addition, it is another object of the present invention to provide an optical waveguide, an optical path thereof being changed at a steep angle in an optical circuit and the optical waveguide for performing coupling and splitting of light being decreased in size in the optical circuit.

As a result of assiduous study, the inventor found out that the above-mentioned problems could be solved by carrying out perforation machining at a predetermined position on the optical waveguide using a laser, thereby completing the present invention. That is, the present invention provides an optical waveguide having a core and a cladding layer, wherein a wall surface, which is formed by cutting out at least a part of the core in a thickness direction of the core by irradiation with a laser beam and crosses at least a part of the core, is a specular surface.

Here, it is preferable that the irradiation of the laser beam be carried out in a direction perpendicular to an optical waveguide plane, and the specular surface is perpendicular to the optical waveguide plane and inclined with respect to an extension direction of the core. As a result, without providing a micro mirror, etc., the optical path can be changed in the optical waveguide plane.

Further, it is also preferable that the irradiation of the laser beam be carried out in a direction inclined with respect to the optical waveguide plane, and the specular surface is inclined with respect to the extension direction of the core. As a result, without separately providing a micro mirror, etc., the optical path can be changed in an out-of-plane direction of the optical waveguide plane, such as a direction perpendicular to the optical waveguide plane.

In the present invention, it is also preferable that a convex portion reflecting the shape of the core be formed on the top surface of the cladding layer, the cutting direction through the irradiation of the laser beam be a direction passing through the convex portion and being inclined with respect to the core, and the specular surface be curved. As a result, a lens effect can be better obtained in changing the optical path in the out-of-plane direction.

The present invention also provides an optical waveguide having a core and a cladding layer, wherein a cut-out surface of the core is a curved specular surface for changing an optical path. As a result, the optical path change having the lens effect can be performed.

Further, the optical waveguide may constitute an optical-electrical circuit board in which the optical waveguide is provided in one surface of a circuit substrate having an electrical circuit formed thereon.

Furthermore, the present invention provides a method of manufacturing an optical waveguide, the method comprising: a step of forming a first cladding layer using a mold having a convex portion corresponding to a core; a step of peeling the first cladding layer from the mold; a step of filling a concave portion formed in a first surface of the first cladding layer having been in contact with the mold with a material forming the core; a step of forming a second cladding layer on the first surface of the first cladding layer; and a step of cutting out at least a part of the core in a thickness direction by irradiating a laser beam to a part of a convex portion, which is formed on the outer surface of the first cladding layer correspondingly to the core, inclined with respect to the core.

As a method of forming an optical coupling hole at a predetermined position, a method in which a photolithography method and a dry etching method are combined also is considered. However, since a thickness of several tens of micrometers must be dry-etched, the method is not practical in view of productivity and cost.

As well as forming a hole at a predetermined position in the optical waveguide plane and forming a specular surface on the intermediate cut-out surface of the core, as shown in FIG. 8, the wall surface 43 of the core 42 formed by irradiating the laser beam to cover an end of the core in the optical waveguide 41 having the core 42 and cutting out the end portion of the optical waveguide may be made to be a specular surface. Further, the wall surface obtained by cutting out the whole portion of the core in the thickness direction with the laser beam may be used as the specular surface, and in this case, the optical path of all of the light passing through the core can be changed. On the other hand, when the wall surface obtained by cutting out the core to an intermediate portion in the thickness direction is used as the specular surface, the optical path of a part of the light passing through the core may be changed and the other light may be made to travel straight as it is.

In the present invention, during the laser beam irradiation, the laser beam relatively pauses with respect to the optical waveguide, of course.

According to the present invention, since the optical coupling can be performed at any position and with various core patterns, the degree of freedom in designing an optical circuit can be remarkably enhanced. Further, by employing a laser beam, the wall surface of a hole can be easily made a smooth specular surface at the same time as forming the hole through irradiation of the laser beam. Furthermore, the optical path conversion or splitting can be performed at any angle, so that it is possible to greatly reduce the size of the optical waveguide. This effect is specifically advantageous for the optical-electrical circuit board. Specifically, by making the wall surface of the core a curved specular surface, it is possible to achieve the optical coupling to a light-receiving element having a small light-receiving diameter or to a light-emitting element having a large divergence angle (numerical aperture) with ease and with high coupling efficiency.

DESCRIPTION OF THE PREFERRED EMBODIMENTS

Hereinafter, the present invention will be described in detail. Here, while an optical waveguide made of polyimide is exemplified, a structure for changing an optical path may be formed using a resin made of an optical material other than polyimide as the material of the optical waveguide. Further, an electrical circuit or another optical circuit may be formed on or in the surface of a substrate on which the optical waveguide according to the present invention is formed.

First, a lower cladding layer made of polyimide is formed on a silicon wafer. A polyimide layer whose part becomes a core and a resist layer are sequentially formed thereon. Next, by performing the exposure using a mask pattern having a desired core pattern, a resist pattern to be a mask is formed. The layer whose part becomes a core is dry-etched with oxygen plasma using the resist pattern as a mask. Next, the resist of the mask is removed with a peeling solution. Next, an upper cladding layer made of polyimide is formed thereon. Then, by immersing the silicon wafer having the multiple layers in an aqueous solution of hydrofluoric acid, the multiple layers which become the optical waveguide is peeled from the silicon wafer. As a result, a film-shaped optical waveguide in which the optical waveguide is formed is obtained.

By irradiating a laser beam at about 45° with respect to an optical waveguide plane in a plane perpendicular to the optical waveguide plane and including an extension direction of the core, a specular surface slanted at 45° with respect to the extension direction of the core can be formed in the core of the optical waveguide. The optical path can be changed perpendicularly to the optical waveguide plane through the specular surface slanted at 45°. The specular surface slanted at 45° may be provided with a metal layer having high reflectance as needed. When using this specular surface, it is not necessary to provide a micro mirror as an individual component separately.

In this way, by forming an electrical circuit or an optical element or an optical circuit in the optical waveguide, or by bonding the optical waveguide onto an electrical circuit substrate, an electrical-optical circuit board can be manufactured in which an optical coupling is possible at any position.

In the optical waveguide according to the present invention, both the cladding layer and the core layer are preferably made of resin and more preferably polyimide resin or epoxy resin. By using the resin, the wall surface of the hole formed through the irradiation of the laser can be easily obtained as a smooth specular surface.

Figure 2:
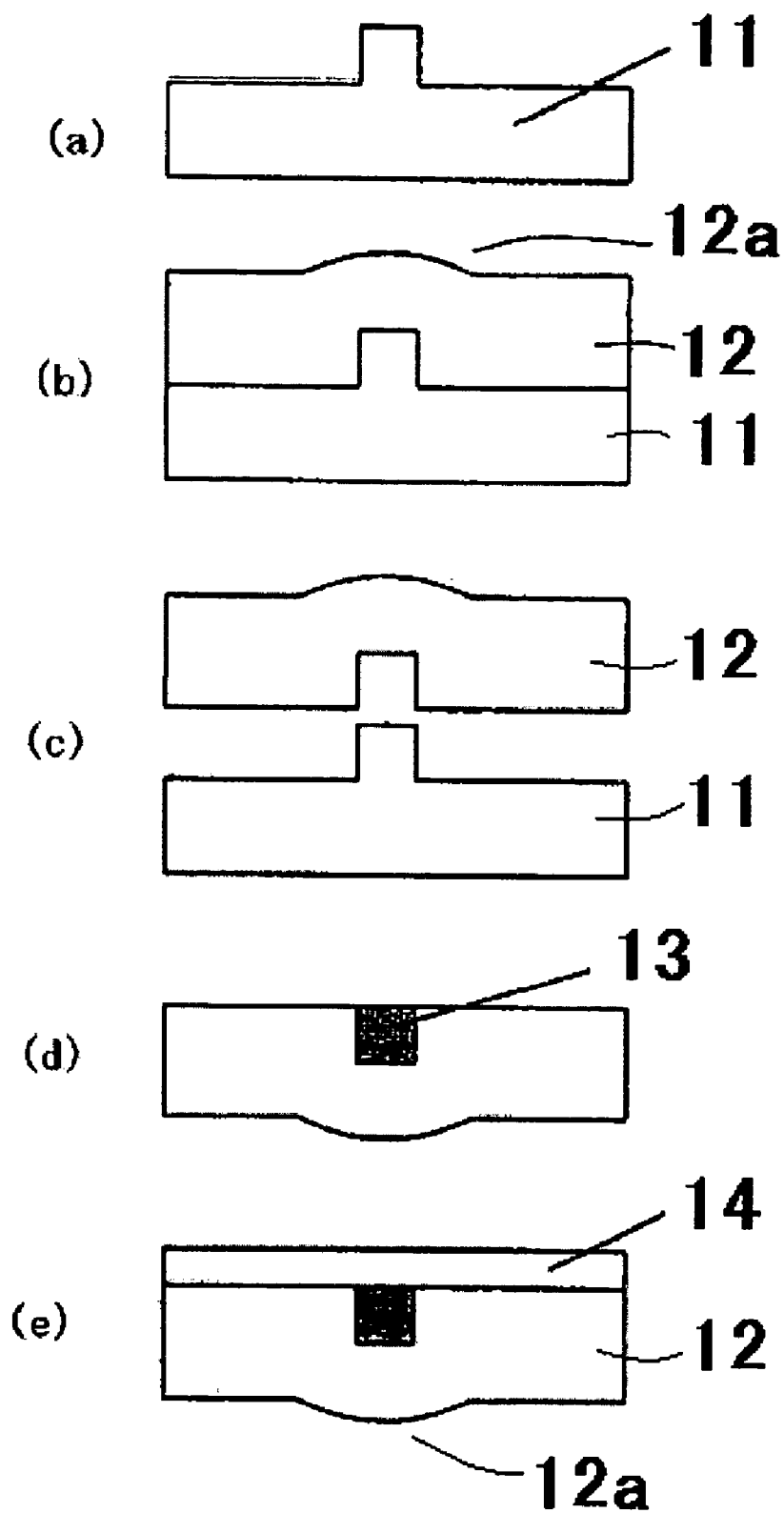
FIG. 2 is a diagram illustrating an example of a method of manufacturing an optical waveguide in which a micro mirror having a lens function is formed according to the present invention.
Figure 3:
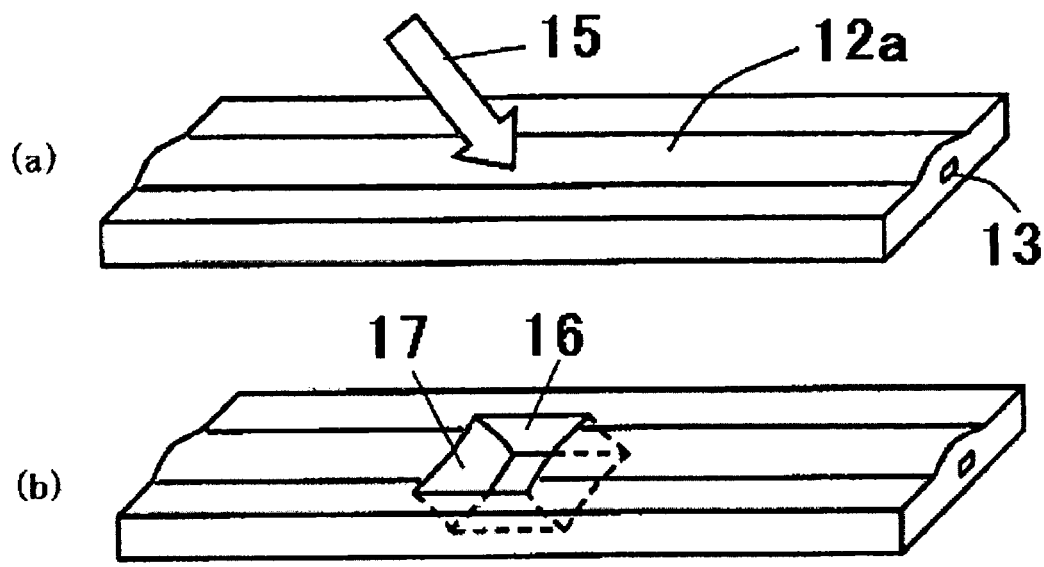
FIG. 3 is a diagram illustrating an example of a step of forming the micro mirror having a lens function according to the present invention.

Next, a method of forming the specular surface into a curved surface will be described with reference to FIGS. 2 and 3. First, a mold 11 on which a desired core pattern is formed is prepared (FIG. 2(a)). A poly(amic acid) solution which is a precursor of polyimide to be the cladding layer 12 is applied thereon using a spin coating method, etc., and then is made to be polyimide through heat treatment. At this time, by properly adjusting the resin concentration of the poly (amic acid) solution, a convex portion 12a reflecting the core pattern is formed on the surface of the cladding layer on the core pattern (FIG. 2(b)). Next, the polyimide film is peeled from the mold (FIG. 2(c)). The peeled polyimide film is inverted up and down, and the poly(amic acid) solution which is a precursor of polyimide to be the core 13 is applied in the groove portion in a filling manner and is made to be polyimide through heat treatment (FIG. 2(d)). Next, the poly(amic acid) solution which is a precursor of polyimide to be a lower cladding layer 14 is applied from the upper side and is made to be polyimide through heat treatment. In this way, the optical waveguide having a convex portion 12a formed by protruding the cladding layer at a predetermined position of the core 13 can be manufactured (FIG. 2(e)).

By irradiating a high-power laser beam 15, such as an excimer laser or a carbon dioxide laser, toward the convex portion 12a obliquely at 45° with respect to the optical waveguide plane from the upper side of the optical waveguide film obtained in this way, as shown in FIG. 3(a), the perforation process is performed at about 45° with respect to the optical waveguide plane. At this time, a mask (not shown) having an opened rectangular window is used. By radiating the laser beam onto the convex portion from the upper cladding layer side having the convex portion 12a, a hole 16 piercing the core is formed. At this time, a smooth specular surface or a cylindrical surface is easily formed in the wall surface 17 of the hole 16 crossing the core of the optical waveguide (FIG. 3(b)). At this time, even if the formed hole has a slight positional deviation in a direction perpendicular to the core pattern direction, it does not matter because it is formed in the convex portion of the clad. When using a flat optical waveguide not having the convex portion of the cladding layer, a curved specular surface is obtained using a mask in which a desired curved line is formed, in place of the rectangular shape.

Figure 4:
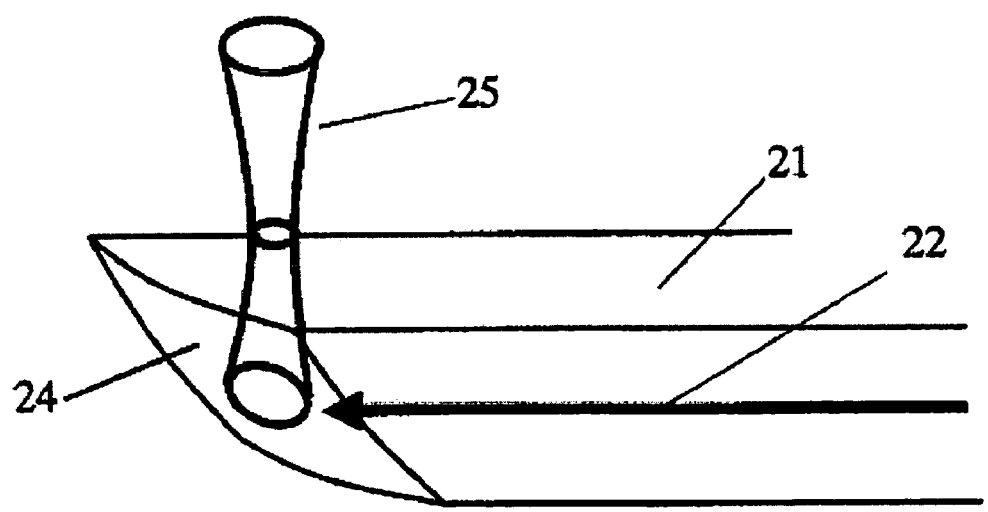
FIG. 4 is a diagram illustrating an example of the micro mirror having a lens function according to the present invention.

The transmission condition of light using the micro mirror obtained in this way in which the cut-out surface of the core is a curved surface is shown in FIG. 4. Here, only the core portion and the mirror portion are shown. The light 22 transmitted through the optical waveguide 21 is reflected by the micro mirror 24 processed at about 45°. In this case, the reflected light 25 is concentrated to be focused on a half of the radius of curvature of a spherical surface. In this way, the light can be focused, so that it is possible to efficiently receive the light, for example, by disposing the light-receiving element toward upper side.

Next, the optical waveguide capable of changing or splitting the optical path in the optical waveguide plane will be described. The optical waveguide having the core patterns patterned into a T shape, an L shape, or a Y shape in accordance with its purpose is used.

By radiating the excimer laser beam in a direction perpendicular to an optical waveguide plane and to a position where the core is bent from the upper side of the optical waveguide, a through-hole is formed at the position. That is, when the excimer laser beam is radiated to a portion overlapping the core of the optical waveguide using a hole-shaped mask, a part of the core is cut out to form a hole. The cut-out surface of the core formed by the hole becomes a specular surface which is an interface between air and the core, and the light is reflected from the specular surface, so that the conversion or splitting of the optical path at a steep angle is possible. The cut-out surface of the core may be coated with a high-reflectance material, or the hole may be filled with a material having a lower refractive index than the cladding layer.

Figure 5:
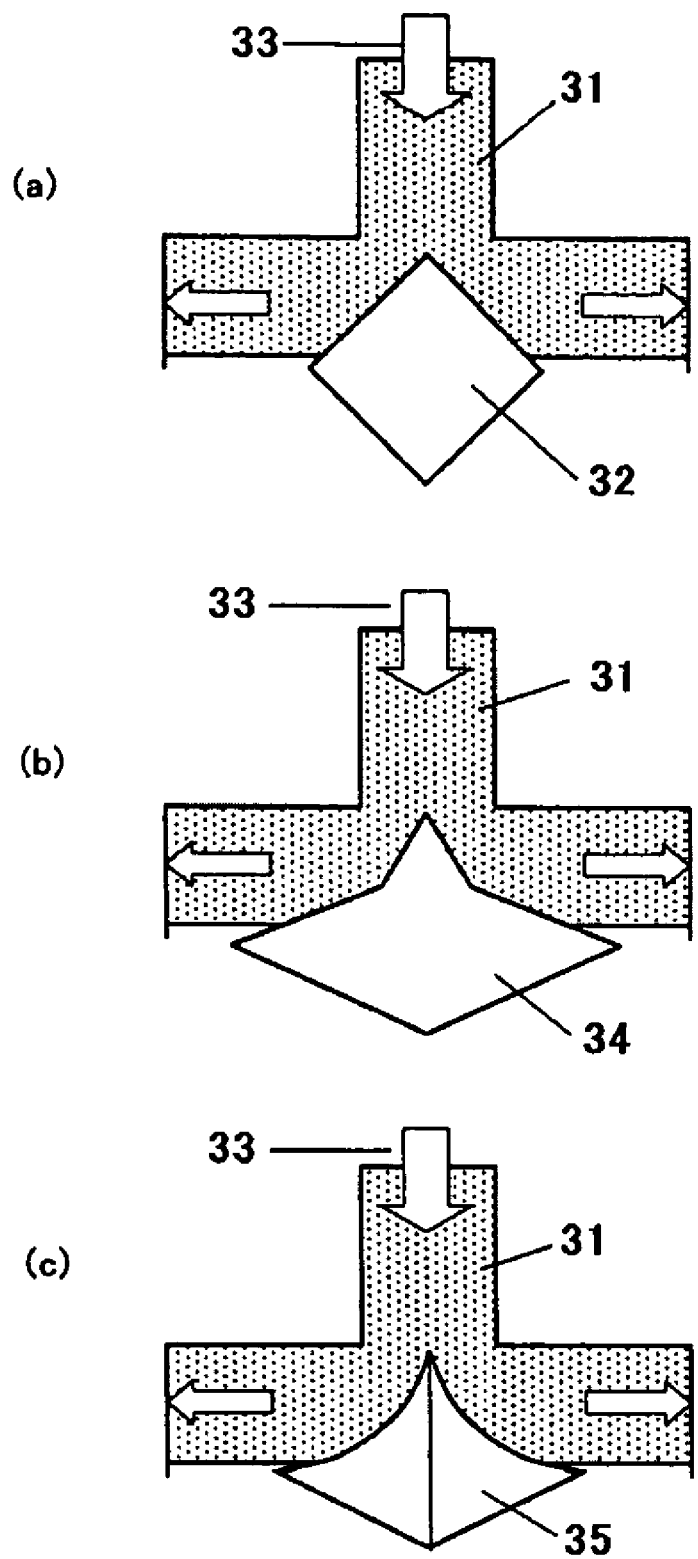
FIG. 5 is a diagram illustrating an example of a T-shaped light splitter using an optical waveguide having a through-hole according to the present invention.

FIG. 5 shows the optical waveguide having a T-shaped core 31, and also shows the shapes of the hole for splitting one light component 33 input from the upper side of the drawing toward left and right directions. In FIG. 5(a), a hole 32 is formed to reflect and split the light in a surface slanted at 45° with respect to the optical axis. In FIG. 5(b), a through-hole 34 is formed to reflect and split the light in a surface in which the optical interface is two-step folded, and in FIG. 5(c), a through-hole 35 is formed to reflect and split the light in a surface in which the optical interface has a curved shape. In FIG. 5, the division ratio can be changed in accordance with a lateral position of the through-hole. The light components may be coupled by inverting the traveling direction of light.

Figure 6:
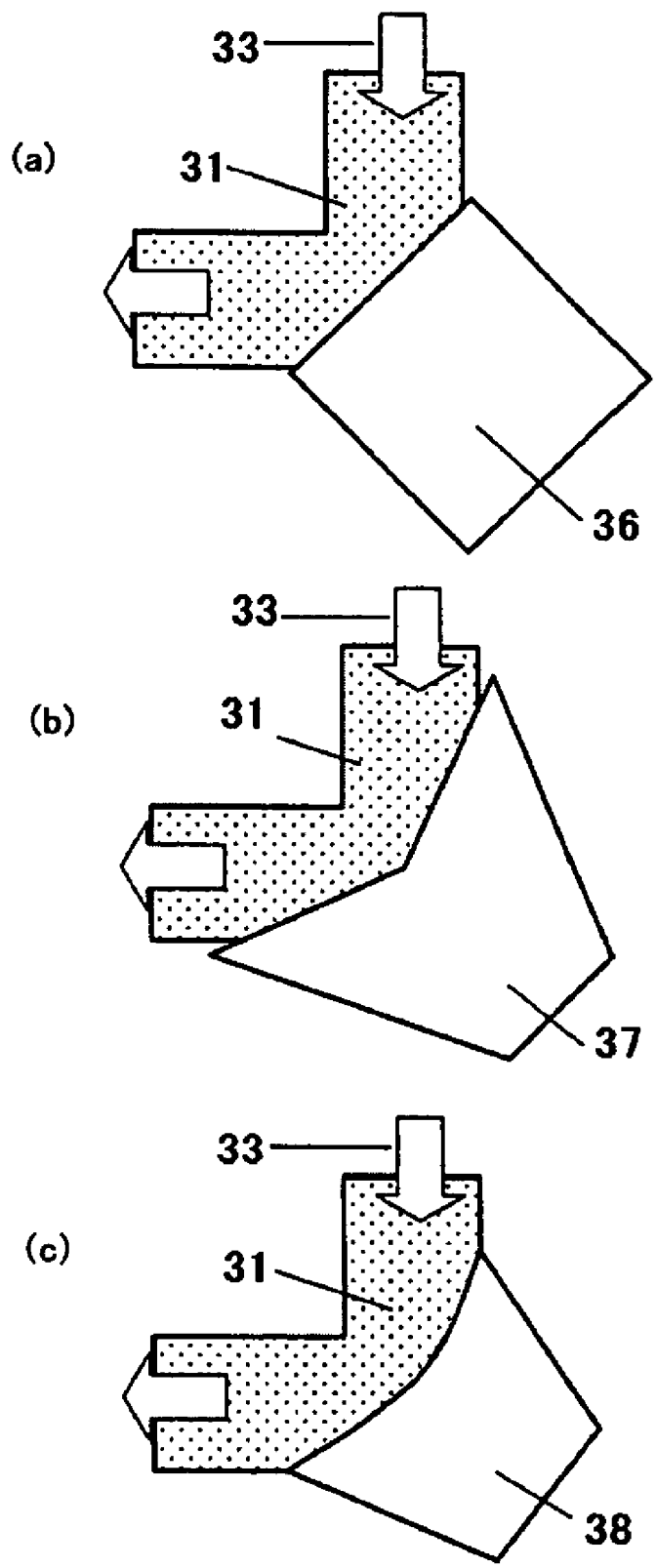
FIG. 6 is a diagram illustrating an example of an L-shaped optical path change using an optical waveguide having a through-hole according to the present invention.

FIG. 6 shows the shapes of the holes for changing the optical path in an L shape. In FIG. 6(a), a hole 36 is formed at a position where the core is bent at a right angle to change the optical path at a right angle, such that a specular surface being inclined at 45° about the optical axis is formed. In FIG. 6(b), a hole 37 is formed to change the optical path in a two-step folded surface, and in FIG. 6(c), a hole 38 is formed to change the optical path in a curved surface. In this way, by only modifying the shape of the hole, various small-sized optical waveguides can be manufactured.

Figure 7:
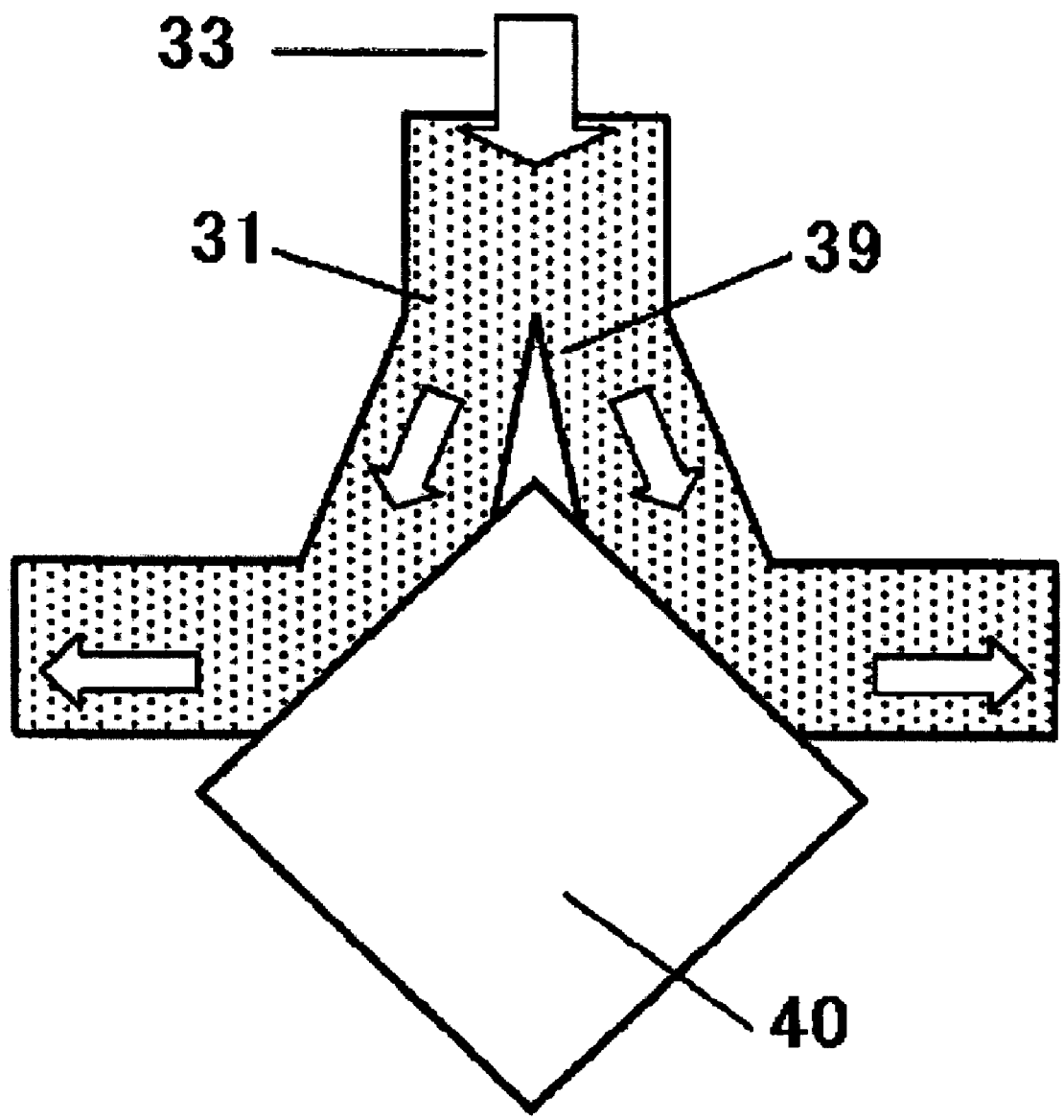
FIG. 7 is a diagram illustrating an example of a Y-shaped light splitter using an optical waveguide having a through-hole according to the present invention.
Figure 8:
FIG. 8 is a diagram illustrating a state in which an end of the optical waveguide has been cut out by a laser.

FIG. 7 shows an optical waveguide in which a through-hole 40 for changing the optical path is formed near a Y division portion 39 of the core having a Y shape right in front of a T shape. Since the division can be carried out by the Y division portion, the 1:1 division can be carried out more accurately even if the lateral positional error of the through-hole is large.

First Embodiment

Polyimide including 2,2-bis(3,4-dicarboxy phenyl) hexafluoropropane 2 anhydride (6FDA) and 2,2-bis(trifluoro methyl)-4,4'-diaminobiphenyl (TFDB) is formed as upper and lower cladding layers on a 5-inch silicon wafer, and polyimide including 6FDA and 4,4'-oxydianiline (ODA) is formed as a core layer disposed between the upper and lower cladding layers. The core on the lower cladding layer is patterned using well-known methods of photolithography and dry etching, and then the upper cladding layer is formed, thereby forming a film-shaped optical waveguide. Here, a plurality of core layers parallel to each other in the longitudinal direction is formed, thereby providing a multi array optical waveguide. Thereafter, the silicon wafer in which the optical waveguide is formed is immersed in an aqueous solution including 5 wt % of hydrofluoric acid and thus the optical waveguide is separated from the silicon wafer, thereby manufacturing a film-shaped optical waveguide. The thickness of the film-shaped optical waveguide is set to 80 μm.

Figure 1:
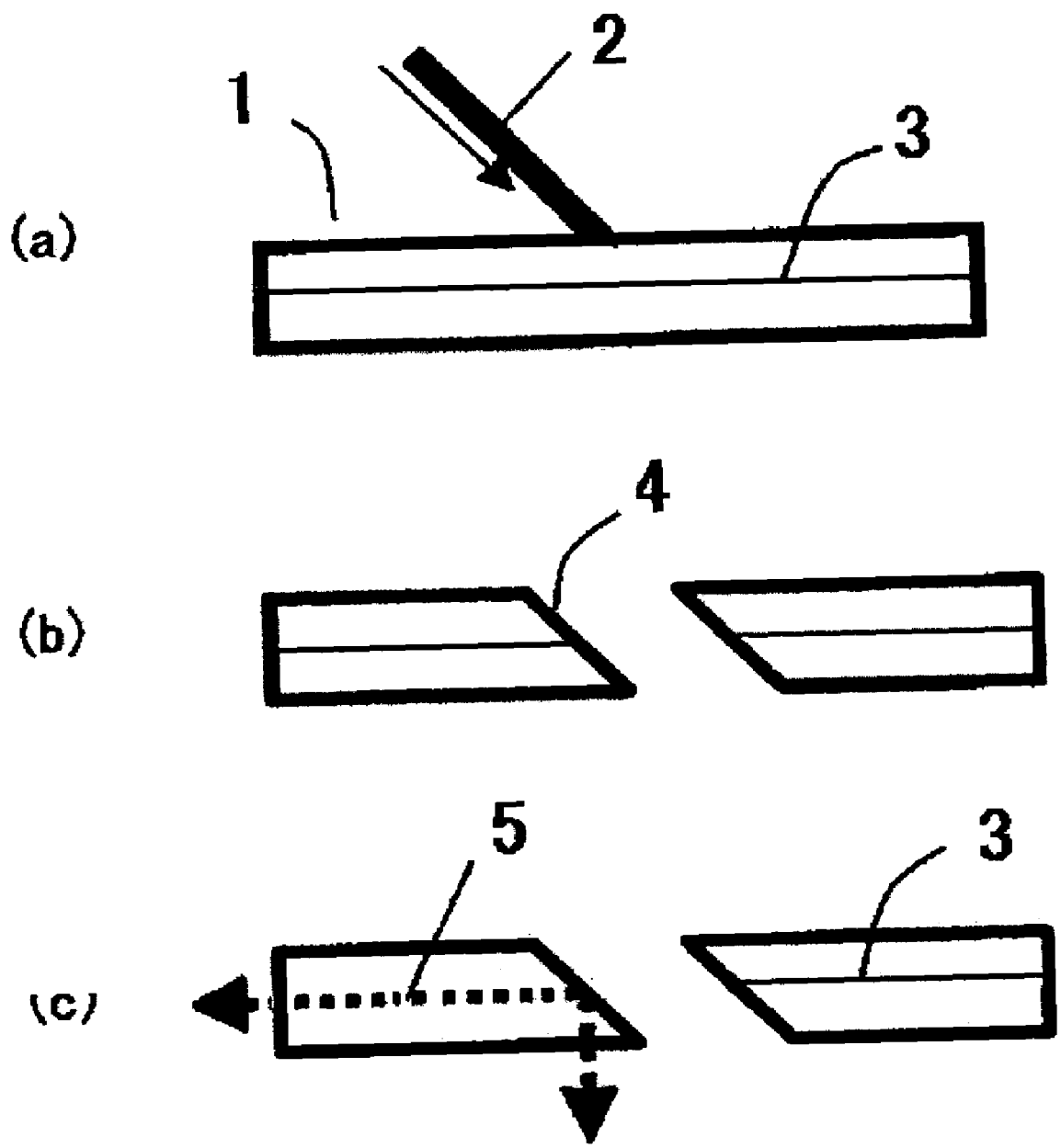
FIG. 1 is a diagram illustrating an example of a manufacture process employing an obliquely irradiated laser beam machining according to the present invention.

The fluorinated polyimide is used to form the film-shaped optical waveguide having a core layer 3 in FIG. 1. The perforation process is performed by irradiating the excimer laser beam 2 in a state where the film-shaped optical waveguide 1 is inclined at 45° about the optical axis of the excimer laser beam (FIG. 1(a)). The application condition includes application energy of 0.4 J/pulse in total and 1 J/(cm²·pulse) in energy density, repeated frequencies of 200 pulses/second, and a time period of 2 second. At this time, the wall surface 4 crossing the core in the formed hole forms an angle of 45° about the plane of the film-shaped optical waveguide (FIG. 1(b)). As a result of irradiating the laser beam to the 45° specular surface using a surface emitting laser (not shown, but from the lower side of the film-shaped optical waveguide in the drawing) perpendicularly to the optical waveguide plane, an optical output could be observed from the other end surface of the core of the optical waveguide along the optical axis 5 (FIG. 1(c)). A metal film may optionally be formed on the 45° specular surface.

The hole whose wall surface is inclined at 45° can be formed at several positions of any place, thereby enhancing the degree of freedom in designing an optical circuit. Further, since a micro mirror as an individual component is not necessarily formed inside the hole, the alignment of the optical axis is facilitated.

Second Embodiment

By dry-etching a 5-inch silicon wafer, a ridge-shaped core pattern having a width of 50 μm and a height of 40 μm is formed. This serves as a mold. A solution of poly(amic acid) including 2,2-bis(3,4-dicarboxy phenyl) hexafluoropropane 2 anhydride (6FDA) and 2,2-bis(trifluoro methyl)-4,4'-diaminobiphenyl (TFDB) is spin-coated thereon and is then made to be polyimide through heat treatment. At this time, the concentration of the solution of poly(amic acid) is set to 25%. A portion protruded along a core pattern is formed on the top surface of the cladding layer on the core pattern. Next, by immersing the cladding layer of polyimide in distilled water, the cladding layer is separated from the silicon wafer. Next, the formed groove is filled with co-polymerized polyimide including 6FDA, 4,4'-oxydianiline (ODA), and 6FDA/TFDB through spin coating and heat treatment. Further, a cladding layer made of 6FDA/TFDB is formed thereon. In this way, the film-shaped optical waveguide is formed. The thickness of the film-shaped optical waveguide is set to 90 μm.

Next, the excimer laser, a mask formed out of a copper alloy plate and having a rectangular window whose one side is 0.15 mm long, and the film-shaped optical waveguide are aligned. Then, the optical waveguide is set to be inclined at 45° about the optical axis of the laser beam. By irradiating the excimer laser beam to the convex portion of the film-shaped optical waveguide, a through-hole is formed to be inclined with respect to the optical waveguide. The application condition includes application energy of 0.4 J/pulse in total and 1 J/(cm²·pulse) in energy density, repeated frequencies of 200 pulses/second, and a time period of 2 second. At this time, the processed surface crossing the core is a spherical surface whose radii of curvature in the inward direction and the thickness direction of the optical waveguide are all about 0.8 mm.

As a result of inserting the light having a wavelength of 850 nm from one end surface of the film-shaped optical waveguide to the optical waveguide, the reflected light could be observed from the micro mirror surface. As a result of receiving the reflected light using optical fibers of 100 μm, it is found out that the light-receiving intensity is about 70%.

Third Embodiment

By forming the upper and lower cladding layers using polyimide including 2,2-bis(3,4-dicarboxy phenyl) hexafluoropropane 2 anhydride (6FDA) and 2,2-bis(trifluoro methyl)-4,4'-diaminobiphenyl (TFDB), forming the core layer using polyimide including 6FDA and 4,4'-oxydianiline (ODA), and performing the well-known methods of photolithography and dry etching thereto, a multimode optical waveguide film is formed on a 5-inch silicon wafer. At this time, the optical waveguide is patterned in a T shape. Thereafter, by immersing the silicon wafer, on which the optical waveguide is formed, in an aqueous solution of 5 wt % of hydrofluoric acid, the optical waveguide is separated from the silicon wafer, thereby forming a film-shaped optical waveguide. The thickness of the film-shaped optical waveguide is set to 80 μm.

Next, a rectangular through-hole is formed at the intersection of the T shape using a reduction optical system-mask projecting KrF excimer laser machining apparatus. The application condition includes application energy of 0.4 J/pulse in total and 1 J/(cm²·pulse) in energy density, repeated frequencies of 200 pulses/second, and a time period of 2 second. As a result, two 90'-splitted light components whose wavelength is set to 850 nm and optical loss at the splitting point is 1 dB are generated.

Fourth Embodiment

Figure 9:
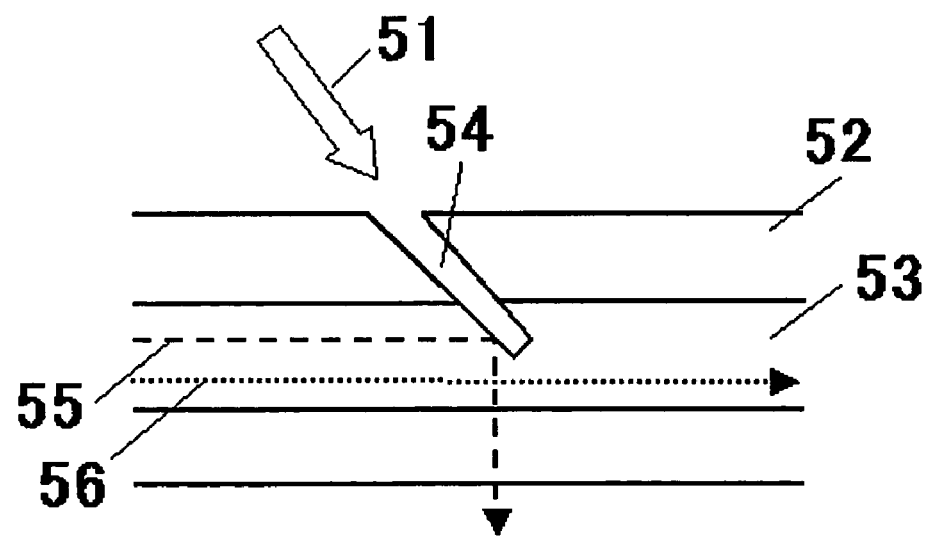
FIG. 9 is a diagram illustrating an optical waveguide in which a core is cut to the middle portion.

So far, it has been exemplified that the core is completely cut out in the thickness direction thereof using the laser beam machining, but by stopping the application of the laser beam before completely cutting the core, the cut-out surface could be formed up to a predetermined position in the thickness direction of the core. Accordingly, it is possible to distribute the light guided by the core. By setting the laser-beam application time to a half of the time required for completely cutting the core, the machined depth can be made to be a half. For example, in FIG. 9, when the application of the excimer laser beam 51 with 200 pulses/second for two seconds is required for forming the through-hole in the polyimide optical waveguide film having a thickness of about 100 μm, the machined hole 54 can be formed up to a half position by setting the application time to one second. In this case, the light component 55 passing through the upper half portion of the core 53 is changed in optical path at the cut-out surface, and the light component 56 passing through the lower half portion of the core 53 proceeds straight. When the machining is stopped at a half position of the core height, the optical distribution can be performed almost at a ratio of 1:1. By changing the depth of the laser beam machining, the distribution ratio is also changed. In this way, not only can the whole light quantity be input and output, but a predetermined ratio of the whole light quantity can be also input and output.

Figure 10:
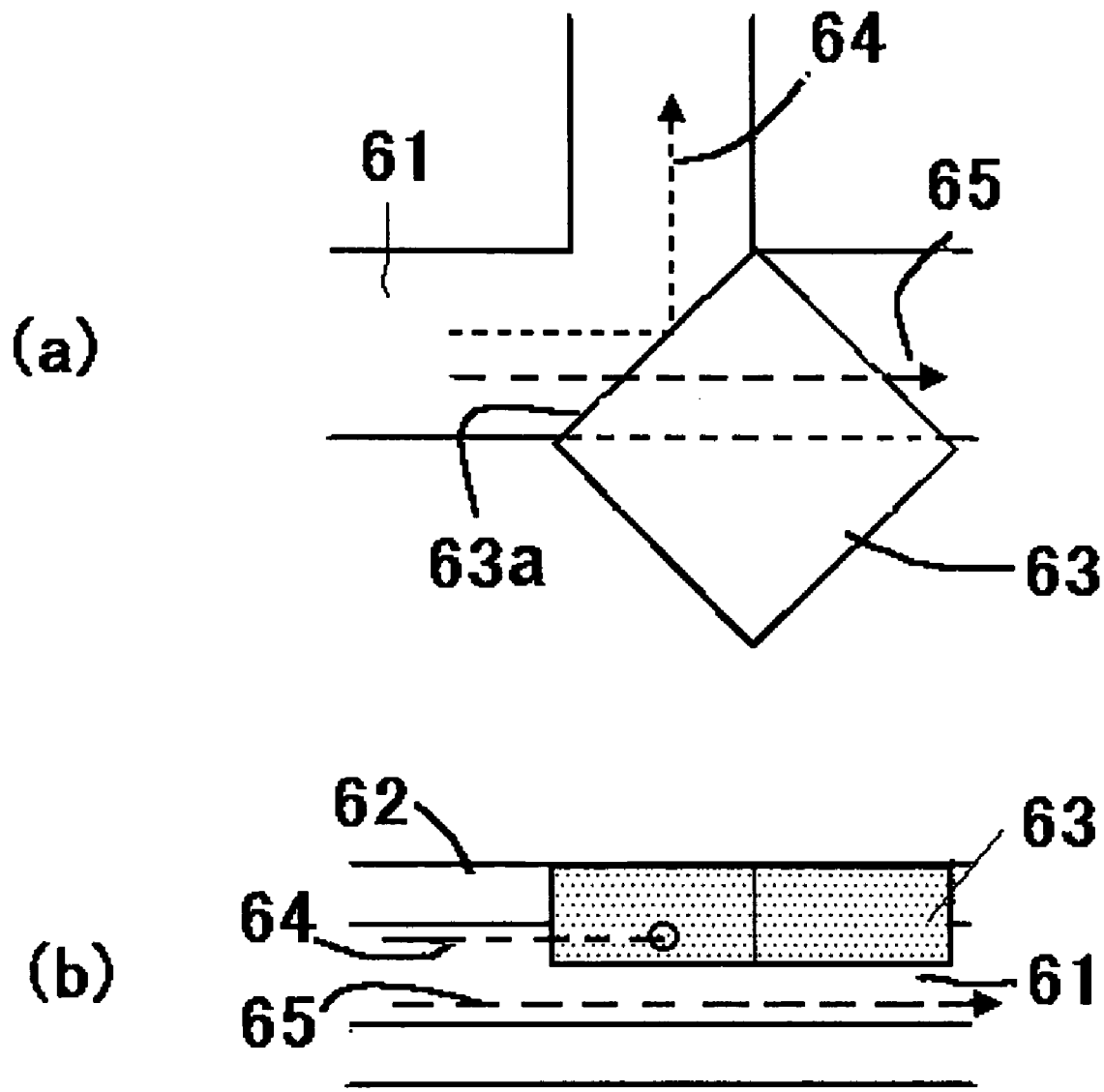
FIG. 10 is a diagram illustrating an optical waveguide in which a core is cut to the middle portion.

Further, as shown in FIG. 10, even when a specular surface is formed to be perpendicular to the optical waveguide plane, the optical distribution is possible by stopping the laser beam machining at an intermediate position. FIG. 10(a) is a plan view of the optical waveguide as seen from the upper side, and FIG. 10(b) is a lateral cut-out surfaceal view of an optical waveguide having a core 61 and a cladding layer 62. A hole 63 is formed up to an intermediate position of the core by applying the laser beam perpendicularly to the optical waveguide surface. The light component 64 passing through the upper portion of the core changes its optical path at a right angle at a wall surface 63a of the hole 63 to be parallel to the optical waveguide plane. On the other hand, the light component 65 passing through the lower portion of the core proceeds straight as it is. At this time, the distribution ratio can be changed by changing the hole depth through the laser beam machining.

The present invention can be applied specifically to an optical integrated circuit, an optical-interconnection optical component, an optical-electrical circuit board, etc.

What is claimed is:

1. An optical waveguide comprising a core and a cladding layer,
    wherein a wall surface, which is formed by cutting out at least a part of the core in a thickness direction of the optical waveguide plane through irradiation of a laser beam in a direction perpendicular to an optical waveguide plane, crosses at least a part of the core, and includes a single specular surface,
    wherein the single specular surface is perpendicular to the optical waveguide plane and inclined with respect to an extension direction of the core,
    wherein the single specular surface has at least first and second portions and is positioned to split a beam simultaneously into first and second beams, the first portion of the single specular surface reflects the first beam toward a first direction in the extension direction of the core and the second portion of the single specular surface reflects the second beam toward a second direction in the extension direction of the core, and
    wherein the first portion of the single specular surface is inclined with respect to the first direction in the extension direction of the core, and the second portion of the single specular surface is inclined with respect to the second direction in the extension direction of the core.

2. An optical waveguide comprising a core and a cladding layer,
    wherein a wall surface, which is formed by cutting out at least a part of the core in a thickness direction of the optical waveguide plane through irradiation of a laser beam in a direction perpendicular to an optical waveguide plane, crosses at least a part of the core, and includes a specular surface,
    wherein the specular surface is perpendicular to the optical waveguide plane and inclined with respect to an extension direction of the core, and
    wherein the specular surface ends in a position inside of the core with respect to the thickness direction of the optical waveguide plane so that the specular surface splits a beam into first and second beams, the first beam continuing on an optical path proceeding inside the core and the second beam being reflected at the specular surface and converted to an optical path parallel to the optical waveguide plane.

3. An optical waveguide comprising a core and a cladding layer,
    wherein a wall surface, which is formed by cutting out at least a part of the core in a thickness direction of the optical waveguide plane through irradiation of a laser beam in a direction inclined with respect to an optical waveguide plane, crosses at least a part of the core, and includes a specular surface,
    wherein the specular surface is inclined with respect to an extension direction of the core, and
    wherein the specular surface ends in a position inside of the core with respect to the thickness direction of the optical waveguide plane so that the specular surface splits a beam into first and second beams, the first beam continuing on an optical path proceeding inside the core and the second beam being reflected at the specular surface and converted to an optical path toward the thickness direction of the optical waveguide plane.

4. An optical waveguide comprising a core and a cladding layer,
    wherein a wall surface, which is formed by cutting out at least a part of the core in a thickness direction of the optical waveguide plane through irradiation of a laser beam, crosses at least a part of the core, and includes a curved specular surface,
    wherein the optical waveguide includes a convex portion protruded along the core formed on a top surface of the cladding layer that enables formation of the curved specular surface, the convex portion having a cutting piercing the core, and
    wherein the cutting through the irradiation of the laser beam is passing through the convex portion and in a direction being inclined with respect to an extension direction of the core.

5. An optical-electrical circuit board in which the optical waveguide according to claim 1 is provided in one surface of a circuit substrate having an electrical circuit.

6. An optical-electrical circuit board in which the optical waveguide according to claim 2 is provided in one surface of a circuit substrate having an electrical circuit.

7. An optical-electrical circuit board in which the optical waveguide according to claim 3 is provided in one surface of a circuit substrate having an electrical circuit.

8. An optical-electrical circuit board in which the optical waveguide according to claim 4 is provided in one surface of a circuit substrate having an electrical circuit.

9. An optical waveguide comprising a core and a cladding layer,
    wherein a wall surface, which is formed by cutting out at least a part of the core in a thickness direction of the optical waveguide plane through irradiation of a laser beam in a direction perpendicular to an optical waveguide plane, crosses at least a part of the core, and includes a single specular surface,
    wherein the single specular surface is perpendicular to the optical waveguide plane and inclined with respect to an extension direction of the core,
    wherein the single specular surface has at least first and second portions and is positioned to split a beam simultaneously into first and second beams, the first portion of the single specular surface reflects the first beam toward a first direction in the extension direction of the core and the second portion of the single specular surface reflects the second beam toward a second direction in the extension direction of the core, and
    wherein the single specular surface is an interface between the waveguide and air or an interface between the waveguide and metal.

* * * * *